May 2, 1961 H. P. LUHN 2,981,981

METHOD OF MAKING CIRCUIT PANELS

Original Filed March 8, 1949

2 Sheets-Sheet 1

INVENTOR
HANS P. LUHN
BY
ATTORNEY

May 2, 1961

H. P. LUHN 2,981,981

METHOD OF MAKING CIRCUIT PANELS

Original Filed March 8, 1949

2 Sheets-Sheet 2

INVENTOR.
HANS P. LUHN

BY [signature]

ATTORNEY.

United States Patent Office 2,981,981

Patented May 2, 1961

2,981,981

METHOD OF MAKING CIRCUIT PANELS

Hans P. Luhn, Armonk, N.Y., assignor to International Business Machines Corporation, New York, N.Y., a corporation of New York Original application Mar. 8, 1949, Ser. No. 80,266, now Patent No. 2,649,513, dated Aug. 18, 1953. Divided and this application Apr. 13, 1953, Ser. No. 348,352

7 Claims. (Cl. 18—59)

This invention relates to a method of making circuit panels, this application being a division of Hans P. Luhn application, Serial No. 80,266, filed March 8, 1949, now Patent No. 2,649,513 issued August 18, 1953, for Distributor and Method for Making the Same.

It is an object of this invention to provide an improved method for making circuit panels that are formed by depositing current conducting paths on a dielectric supporting base, and in this regard certain improved procedures are contemplated herein.

In connection with the method described herein, it is an object to provide a distributor or other electrical circuit component of the deposited metal type which will present a smooth contact face for cooperation with a movable part such as a wiper brush, whereby a good electrical contact is provided and the contacting parts subject to movement therebetween, as between a fixed contact and a movable wiper, are protected against undue wear during their operation.

Furthermore, it is an important object of the invention to provide improved, durable, deposited, circuit paths on a supporting base, and particularly depositing the circuit paths in firmly bonded relation to their supporting base.

It is also an important object hereof to provide a circuit element of the type indicated wherein current conductors are disposed in a unitary supporting body, and the method disclosed herein contemplates the production of current conducting elements composed of a plurality of components disposed in spaced planes within a unitary supporting body.

Further objects and advantages of the invention will appear as the following detailed specification is read with reference to the drawings forming a part hereof and in which drawings.

It is contemplated that all circuit paths forming a part of the element be deposited on a receiving base, so that the path in effect becomes a part of the base. It has been known heretofore to provide electrical circuits by painting, spraying or printing a metallic ink, paint or liquid composition on the surface of a non-conducting sheet, and in general, the method herein involved contemplates certain improvements on the methods heretofore used. The term "deposited," as herein used, is to be taken, therefore, in its broad sense to embrace painting, printing, spraying or otherwise applying to a base component a current conducting coating in the form of circuit paths.

In brief, one specific practice of the method involves the application of a mask or template to opposite sides of a non-conducting component sheet and the formation of circuit paths upon such non-conducting component sheet by spraying against the opposite faces thereof a metal fog or mist produced by projecting molten metal from a nozzle under suitable fluid pressure.

Any more or less liquid conducting composition may be employed for depositing the circuit paths. For example, a metallic ink can be employed and such deposits may be subsequently electro-plated with an appropriate material to form a deposit of substantial thickness and one having the desired strength and capacity.

There is available a coating composition consisting of a finely powdered metal with a quick drying resinous binder. Such compositions may be employed for spraying, painting or otherwise depositing the circuit paths. The latter compositions are particularly adapted for screen printing the circuit paths on to the dielectric base plates of the components. Circuit paths so deposited may be quickly dried by subjecting them to a temperature sufficiently high to volatilize the liquidifying constituent.

The formation of parts of the circuits which are subject to mechanical wear are best formed by the spraying of metal because of the tough, wear-resisting quality of such sprayed surfaces. However, less wear-resistent circuits may be traced on parts of the element that are not subject to mechanical wear, and for such circuits metallic paints, inks and other conducting coating compositions may be employed with advantage.

Further, it is contemplated that the circuit paths may be deposited on the insulating base of the components by sputtering or vapor transfer of metal under a vacuum. For the purpose of such procedures, the base plates are first conditioned by defining the portions on which the circuits are to be deposited by rendering such portions conductive and by the use of a mask, respectively, so that the metal will adhere only to the areas so conditioned.

Figure 1:
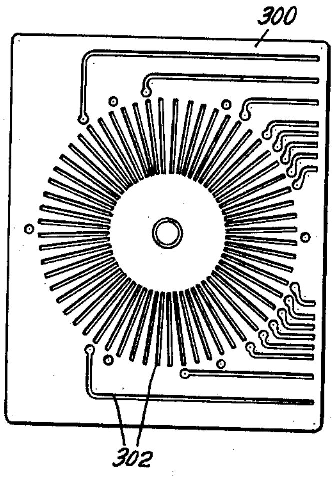
Fig. 1 is a plan view of a circuit path depositing mask.
Figure 2:
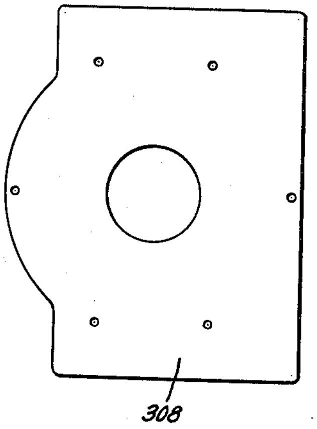
Fig. 2 is a plan view of a plate-like non-conducting element forming the base of a component structure.
Figure 3:
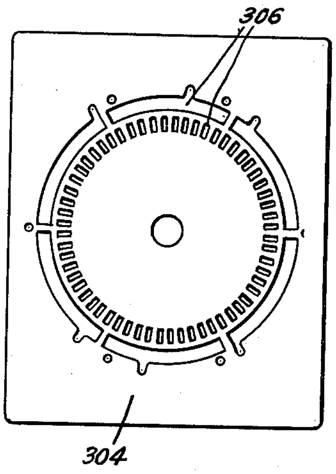
Fig. 3 is a plan view of a circuit path depositing mask of a different kind.
Figure 4:
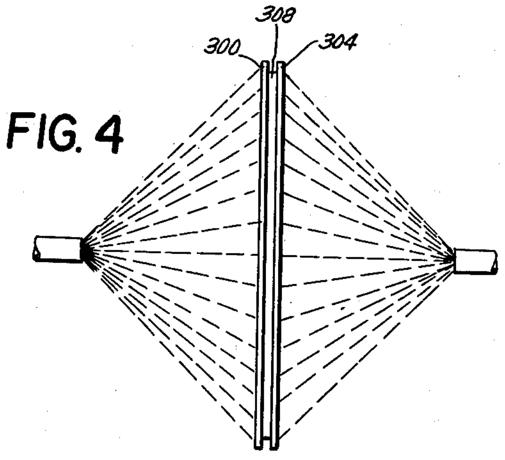
Fig. 4 is a side elevational view of a component base impressed between two conducting path depositing masks disposed in the path of a pair of metal spraying nozzles.

In Fig. 1 is illustrated a mask 300, having therein a plurality of slots 302, which represent a circuit pattern sought to be deposited on the face of a circuit component sheet. Fig. 3 shows a mask 304, which is generally similar to that shown in Fig. 1, but wherein the slots 306, which are representative of the circuit to be deposited, are of a different form. A relatively thin yielding sheet of non-conducting material 308 of any desired shape or dimensions may be used as the base of the component on which circuit paths are deposited in accordance with the method. The deposition of the circuit forming paint or composition is preferably accomplished by spraying the composition in the predetermined patterns, as governed by the masks 300 and 304. Accordingly, the component base 308 is positioned between a pair of masks, such as 300 and 304, the masks being of sufficient size to cover all of the working area of the component base and being slotted according to the predetermined pattern, which is to constitute the deposited circuit path on opposie faces of the component base. After assembly of the masks with the component base sheet, the metal or other liquid or semi-liquid conducting composition may be sprayed or otherwise deposited against opposite faces of the component base, as diagrammatically represented in Fig. 4 of the drawings.

Figure 5:
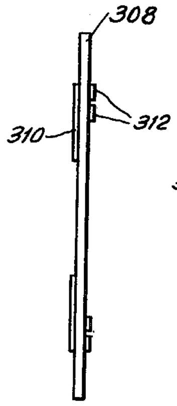
Fig. 5 is a side elevational view of a component after conducting paths have been deposited thereon.
Figure 6:
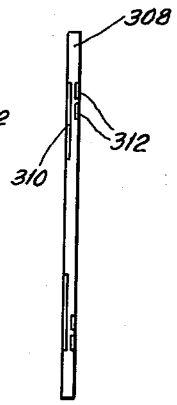
Fig. 6 is a view similar to Fig. 5 but shows the manner in which circuit paths have been embedded in the component base by application of pressure.

After the spraying operation has been completed the deposited conducting circuit paths are disposed on the component base in relief, as indicated at 310 and 312 in Fig. 5 of the drawings. For certain purposes, particularly in connection with the use of a wiper brush or the like that has mechanical contact with and regular or intermittent movement in contact with such deposited part, it is desirable that the circuit path be wholly within the plane of the component base and preferably flush with the facial surface thereof to avoid undue wear of the contacting surfaces. A satisfactory position of the circuit paths is shown in Fig. 6, wherein the paths 310 and 312 are flush with the face of the component base 308. This objective is achieved by selecting a compressible component base and pressing the circuit paths into the base by subjecting the components to pressure after the paths have been deposited thereon. In a specific practice of this phase of the method, it has been found that a suitable component base is a partially cured phenol condensate sheet possessing the necessary yielding characteristic to permit the circuit paths to be pressed into the face of the base. Since the specific base material is of no consequence so long as it is a non-conductor of electricity and possesses a yielding quality, a choice of such materials is available to those skilled in the art. For example, the component base may be a sheet or block of cellulose acetate or acrylic resin. The material employed may be either thermo-plastic or thermo-setting so long as the essential properties are present.

Figure 7:
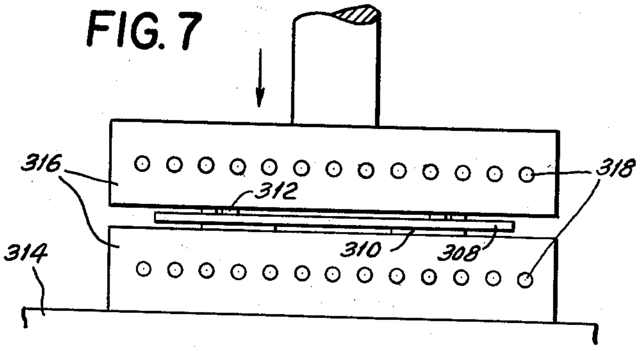
Fig. 7 is a fragmentary view of a press having between the plates thereof a circuit element component.

When a partially cured phenol condensate base is employed, it is appropriate to press the sprayed plate while applying heat to effect the further and complete curing thereof. Herein it is contemplated, therefore, that the components be compressed at a temperature of 300° to 350° F. and under a pressure of 1000 to 2000 pounds per square inch, as, for example, in a press 314, such as diagrammatically and partially illustrated in Fig. 7 of the drawings. A press of this type will include as essential elements a pair of press plates 316, which may be provided with heating means, such as steam coils or electric resistance heaters 318. Higher pressures may be employed, but for successful operation at substantially higher pressures it may become necessary to use a mold to confine the lateral movement of the base material.

The smooth, flush position of the path obtained by pressing the sprayed components is only one of the benefits flowing from the exercise of this part of the method. The electrical circuit element may include a plurality of components which have on confronting faces circuit paths that occupy a common position, and which, therefore, lie in contact with each other when two or more components are placed in face-to-face relationship. It will be appreciated, therefore, that the pressing of a plurality of components will more effectively unite common conducting paths, so that such common paths will function as a single path. When using a compressible component base material, as for example, semi-cured phenol condensate, pressing of a plurality of components in face-to-face contact under heat and pressure will result in the flowing together or fusing of the separate component base members into such intimate relation as to form a unitary structure, such structure being in effect a single multi-circuit carrying body of homogenous character.

Figure 8:
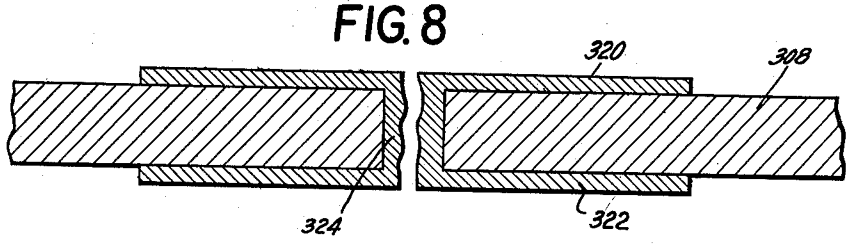
Fig. 8 is an enlarged fragmentary sectional view of a component showing the nature of a transverse impulse conducting path formed therein.
Figure 9:
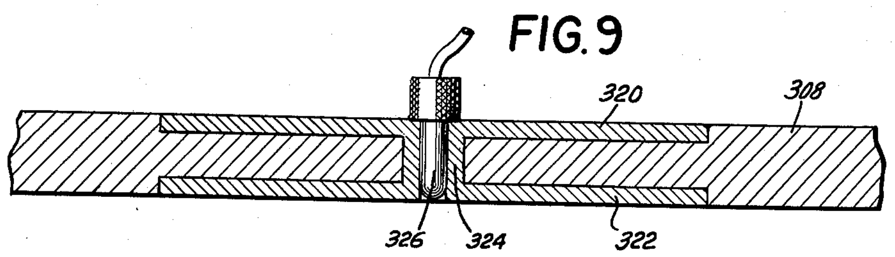
Fig. 9 is an enlarged fragmentary cross-sectional view through a component showing the manner in which transverse conducting paths may be plugged.
Figure 10:
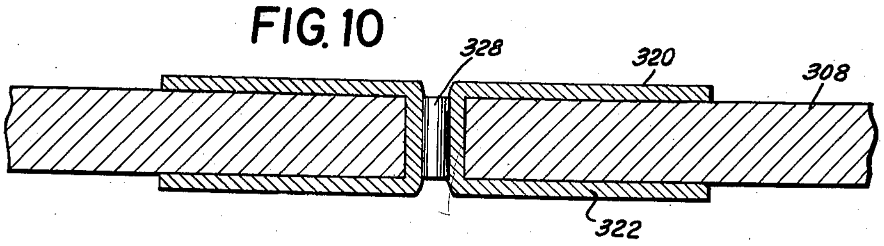
Fig. 10 is a fragmentary cross-sectional view through an element prior to compression thereof, and shows in the transverse passage a forming pin.

It has been pointed out hereinbefore that the transverse connections, which electrically join intersecting circuit paths on opposite faces of a component, are formed by piercing the base of the component from face-to-face and by spraying or otherwise depositing an electrically conductive composition on the walls of the transverse passage. It is sometimes desirable that a transverse connector, whether interconnecting oppositely disposed circuit paths or not, be adapted to receive a connecting plug. Without exercising specific precaution to render the transverse connection pluggable, the passage leading from one face of a component to another may be partially or completely blocked by the conducting composition during the spraying operation. Such condition is particularly prevalent after subjecting the component to pressure. In Fig. 8 is shown a section of a component base 308, having deposited thereon oppositely disposed circuit paths 320 and 322. Herein a transverse connecting passage has been formed in the base 308 by piercing the base in the zone of oppositely disposed circuit paths 320 and 322. Thereafter the conducting material has been sprayed into the passage forming an interconnecting annulus 324 therein. The shape and position of the inner walls of the annulus 324 are normally beyond accurate control, and it frequently happens, particularly after the element has been compressed, that the transverse passage is completely obliterated, whereas the desired condition, as shown in Fig. 9, is one in which the walls of the annulus 324 remain substantially cylindrical for the ready reception of a conducting plug 326.

Figure 11:
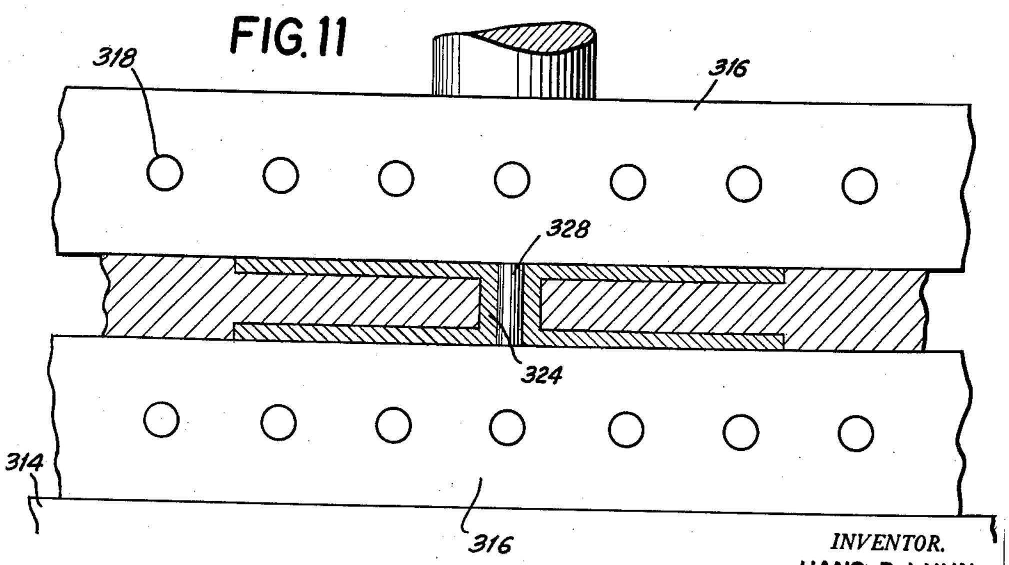
Fig. 11 is a fragmentary sectional view through a pair of pressed plates showing the condition of the component of Fig. 10 after application of pressure.

The desired condition can best be brought about by inserting a forming element such as a plug into the passage prior to the pressing operation. Thus, a plug 328 may be inserted into the passage before the component is subjected to pressure, and as seen from Fig. 11 of the drawing, when a component so conditioned is placed between the plates 316 of the press 314 and subjected to pressure therebetween, the plug 328 will serve to form a connecting transverse passage having cylindrical walls 324, which are adapted to the plugging function referred to.

The procedure shown in Figs. 8 through 11 of the drawings is, of course, simply for the purpose of suggesting the steps that may be used to achieve the purpose, and any suitable or feasible procedure may be resorted to, so long as a sustaining element is used in the through passage for molding and shaping the walls of the passage during the pressing operation. It is contemplated that the forming elements or plugs 328 be adapted for mechanical manipulation as, for example, by incorporating them into the base or head platen of the press 314.

The practice of the invention in its several aspects has been shown and described herein in single embodiments merely for the purpose of rendering concise the explanation thereof. Certain modifications have been alluded to for the purpose of suggesting the broader aspects. It is intended, therefore, to be limited only as indicated by the scope of the following claims.

I claim:

1. The method of forming an electric circuit carrying panel which comprises spraying a conductive material to form a predetermined circuit pattern including individual conductors on at least one surface of a semi-cured, deformable panel of thermo-setting dielectric material, and simultaneously applying heat and pressure to the panel and the circuit pattern thereon to embed the circuit pattern into flush relation with the dielectric surface and to harden and cure the panel.

2. The method of forming an electric circuit carrying panel which comprises spraying a conductive material to form a predetermined circuit pattern including individual conductors on at least one surface of a semi-cured, deformable panel of thermo-setting dielectric material, and simultaneously applying heat and pressure to the circuit pattern carrying surface and the opposite surface of the panel to embed the circuit pattern into flush relation with the dielectric surface and to harden and cure the panel.

3. The method of forming an electric circuit carrying panel which comprises spraying a conductive material to form predetermined circuit patterns on each of the opposed surfaces of a semi-cured, deformable panel of thermo-setting dielectric material, and simultaneously applying heat and pressure to such opposed surfaces to embed the circuit patterns into flush relation with the dielectric surfaces, and to harden and cure the panel.

4. The method of making electrical circuit elements, which consists in spraying a circuit path of conductive material on the face of a semi-cured, non-conducting, thermo-setting base component, subjecting such component and circuit path thereon to sufficient pressure to press the path into the base component, and simultaneously applying heat to the component to complete the curing thereof.

5. The method of making electrical circuit elements, which consists in depositing a circuit path of conductive material on the face of a partially cured phenol condensate base panel, subjecting said base panel and circuit path thereon to a pressure of 1000–2000 pounds per square inch of base panel to press the circuit path into the base panel, and subjecting said base panel to a temperature of 300–350° F. while compressing the same to complete the curing of the base panel.

6. The method of making electrical circuit elements, which consists in depositing a circuit path of conductive material on the face of a partially cured panel of thermosetting material which will cure in a heat of 300–350° F., subjecting such panel and circuit path thereon to a pressure of 1000–2000 pounds per square inches of panel to press the circuit path into the base panel, and subjecting said base panel to a temperature of 300–350° F. while compressing the same to complete the curing of the base panel.

7. The method of forming an electrical circuit pattern, which consists in forming a plurality of spaced individual conductors on at least one surface of a semi-cured, deformable panel of thermo-setting dielectric material, and applying heat and simultaneous pressure to the panel and the conductors thereon to embed the conductors into flush relation with the dielectric surface and to harden and cure the panel.

References Cited in the file of this patent

UNITED STATES PATENTS

| | | |
|---|---|---|
| 1,987,969 | Parkin | June 15, 1935 |
| 2,064,971 | Edison | Dec. 22, 1936 |
| 2,289,339 | Brennan | July 14, 1942 |
| 2,626,206 | Adler et al. | Jan. 20, 1953 |

FOREIGN PATENTS

| | | |
|---|---|---|
| 570,877 | Great Britain | Aug. 23, 1944 |